(12) United States Patent
Schreck

(10) Patent No.: US 11,978,479 B2
(45) Date of Patent: May 7, 2024

(54) REGENERATIVE BRAKING FOR TAPE DRIVE

(71) Applicant: Western Digital Technologies, Inc., San Jose, CA (US)

(72) Inventor: Erhard Schreck, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/845,792

(22) Filed: Jun. 21, 2022

(65) Prior Publication Data
US 2023/0410844 A1      Dec. 21, 2023

(51) Int. Cl.
| | | |
|---|---|---|
| *G11B 15/44* | (2006.01) | |
| *G11B 5/008* | (2006.01) | |
| *G11B 15/32* | (2006.01) | |

(52) U.S. Cl.
CPC ........ *G11B 15/442* (2013.01); *G11B 5/00813* (2013.01); *G11B 15/32* (2013.01)

(58) Field of Classification Search
None
See application file for complete search history.

(56) References Cited

U.S. PATENT DOCUMENTS

| | | | | |
|---|---|---|---|---|
| 4,481,449 A | * | 11/1984 | Rodal | G11B 15/22 360/74.1 |
| 4,767,970 A | * | 8/1988 | Rodal | G11B 15/22 318/261 |
| 5,717,537 A | | 2/1998 | Watanabe et al. | |
| 6,305,628 B1 | | 10/2001 | Thompson et al. | |
| 6,819,065 B1 | | 11/2004 | Howarth et al. | |
| 2018/0090165 A1 | | 3/2018 | Asmussen et al. | |

FOREIGN PATENT DOCUMENTS

| | | |
|---|---|---|
| JP | H0845140 A | 2/1996 |
| JP | 2000011533 A | 1/2000 |

OTHER PUBLICATIONS

"Design Considerations in Selecting Supercapacitors." Technical Note PS-5501, Design Considerations in Selecting Eaton Supercapacitors, Dec. 2017, http://www.eaton.in/content/dam/eaton/products/electronic-components/resources/technical/eaton-design-considerations-supercapacitors-selection.pdf.

* cited by examiner

*Primary Examiner* — Craig A. Renner
(74) *Attorney, Agent, or Firm* — PATTERSON + SHERIDAN, LLP

(57) ABSTRACT

The present disclosure generally relates to a tape drive having a regenerative braking system. The tape drive comprises a first reel; a first spindle coupled to the first reel; a first motor coupled to the first spindle, wherein the first motor is configured to rotate the first spindle; a second reel; a second spindle coupled to the second reel; a second motor coupled to the second spindle, wherein the second motor is configured to rotate the second spindle; and a regenerative braking circuit coupled to the first motor and the second motor, wherein during a braking of the motors, the regenerative braking circuit and the motors convert a mechanical energy of the motors to electrical energy for a power storage mechanism, thereby providing resistance to the rotation of the spindles.

20 Claims, 5 Drawing Sheets

REGENERATIVE BRAKING FOR TAPE DRIVE

BACKGROUND OF THE DISCLOSURE

Field of the Disclosure

Embodiments of the present disclosure generally relate to a tape drive having a regenerative braking system.

Description of the Related Art

Conventional tape drive storage systems comprise a magnetic tape wound around a dual reel (reel-to-reel cartridge) or a single reel (endless tape cartridge). A motor is coupled to the reel(s), wherein the motor, which is powered by an external power source, is configured to rotate the reel(s) in order to move the magnetic tape over one or more transducer heads during write/read operations. To maintain accuracy in reading/writing of data to the tape, proper tape tension is maintained. As such, tape drive systems have highly sophisticated braking mechanisms for controlling the rotational speed of the reel(s) to maintain the desired tape tension.

Being an electronic device, tape drive storage systems are, unfortunately, susceptible to unexpected and therefore emergency power off (EPO) situations where the external power source to the tape drive is removed. Once the external power source is removed, the reel(s) no longer rotates and data cannot be written or read. To counteract EPO situations, tape drives and other data storage systems may utilize a battery or capacitor to provide at least some energy to permit the tape drive to prepare for losing power. The battery or capacitor is charged by the external power source and, upon loss of the external power, can power the tape drive temporarily. Charging the battery or capacitor with the external power source works well, but as with any external power source, involves a cost.

Therefore, there is a need in the art for an improved tape drive that can withstand an EPO situation in a more affordable manner.

SUMMARY OF THE DISCLOSURE

The present disclosure generally relates to a tape drive having a regenerative braking system. The tape drive comprises a first reel; a first spindle coupled to the first reel; a first motor coupled to the first spindle, wherein the first motor is configured to rotate the first spindle; a second reel; a second spindle coupled to the second reel; a second motor coupled to the second spindle, wherein the second motor is configured to rotate the second spindle; and a regenerative braking circuit coupled to the first motor and the second motor, wherein during a braking of the motors, the regenerative braking circuit and the motors convert a mechanical energy of the motors to electrical energy for a power storage mechanism, thereby providing resistance to the rotation of the spindles.

In one embodiment, a tape drive comprises: an enclosure; a first reel disposed in the enclosure to accept a tape configured to wind around the first reel; a first spindle coupled to the first reel; a first motor coupled to the first spindle; a power storage mechanism; a first regenerative braking circuit coupled to the first motor and the power storage mechanism wherein during a braking of the first motor, the regenerative braking circuit and the first motor convert a mechanical energy of the first motor to electrical energy for the power storage mechanism, thereby providing resistance to the rotation of the first spindle.

In another embodiment, a tape drive comprises: an enclosure; a first reel disposed in the enclosure configured to accept a tape configured to wind around the first reel; a second reel disposed in the enclosure and configured to accept the tape configured to wind around the second reel; a motor coupled to the second reel; and a power storage mechanism coupled to the motor and configured to be coupled to a storage capacitor, wherein the storage capacitor is external to the tape drive, wherein during a braking of the motor, a regenerative braking circuit and the motor convert a mechanical energy of the motor to electrical energy for the power storage mechanism, thereby providing resistance to the rotation of the second reel.

In yet another embodiment, a tape drive comprises: an enclosure; a first reel disposed in the enclosure and configured to accept a tape configured to wind around the first reel; a means for controlling a rotational speed of the first reel; and a means for power storage coupled to the means for controlling the rotational speed of the first reel.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of the disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a tape drive having a regenerative braking system. The tape drive comprises a first reel; a first spindle coupled to the first reel; a first motor coupled to the first spindle, wherein the first motor is configured to rotate the first spindle; a second reel; a second spindle coupled to the second reel; a second motor coupled to the second spindle, wherein the second motor is configured to rotate the second spindle; and a regenerative braking circuit coupled to the first motor and the second motor, wherein during a braking of the motors, the regenerative braking circuit and the motors convert a mechanical energy of the motors to electrical energy for a power storage mechanism, thereby providing resistance to the rotation of the spindles.

Figure 1A:
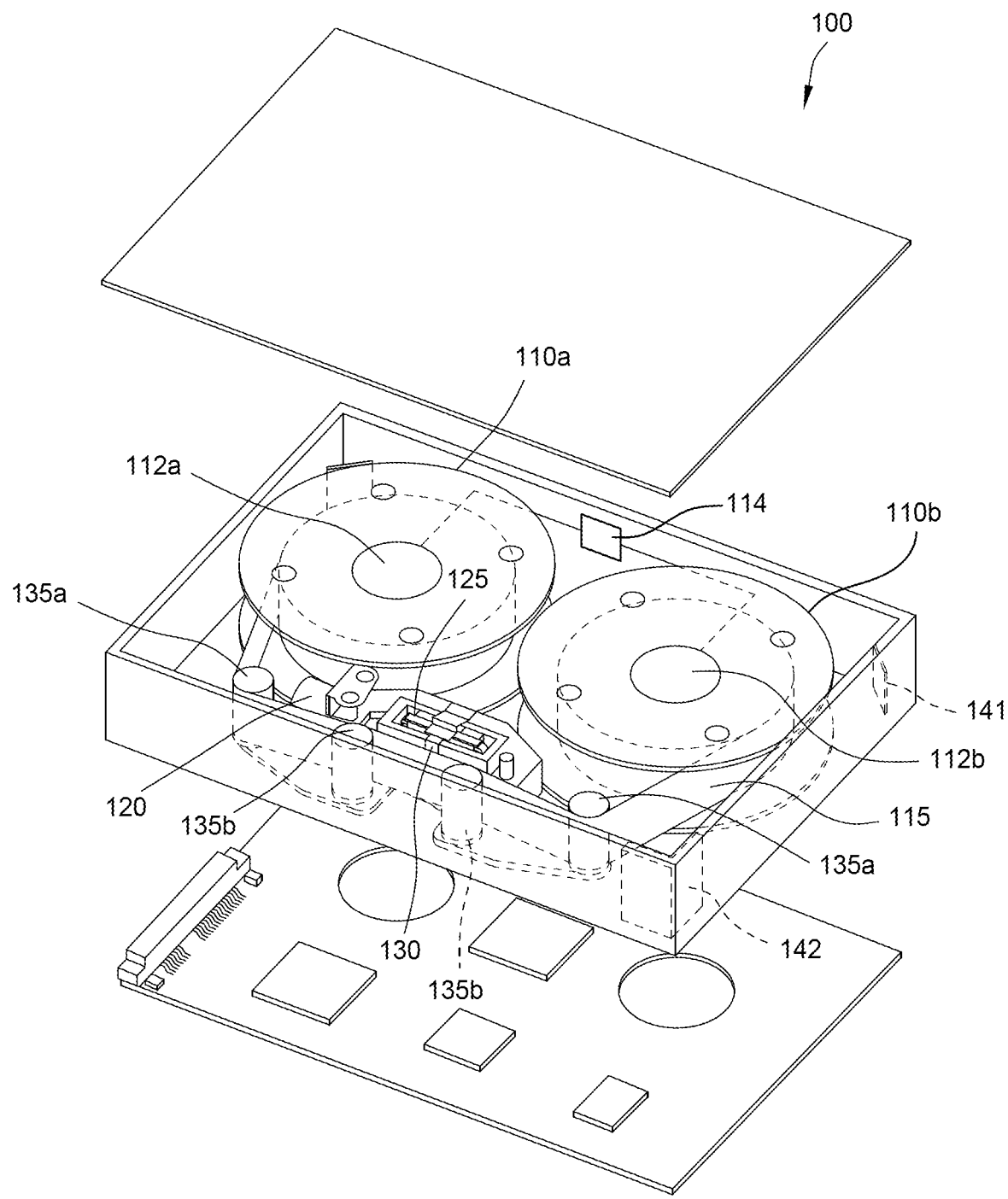
FIGS. 1A-1C illustrate a perspective exploded view, a simplified top down, and side profile view of a tape drive, in accordance with some embodiments.
Figure 1B:
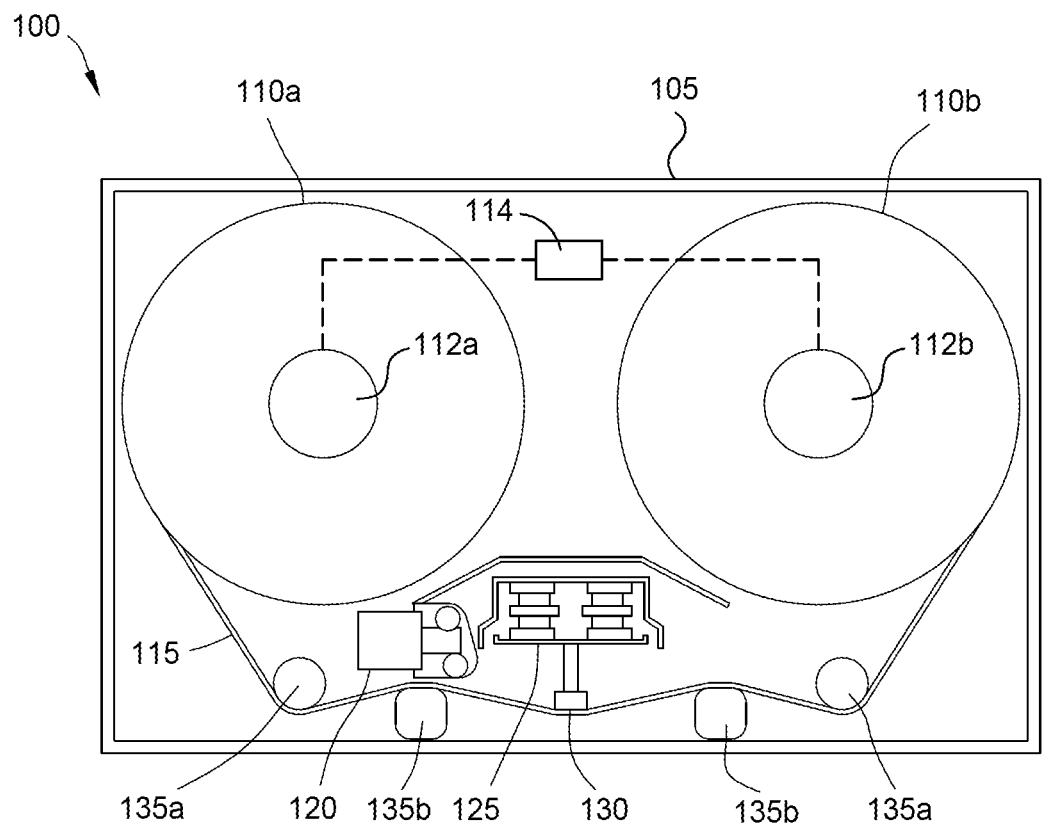
Figure 1C:
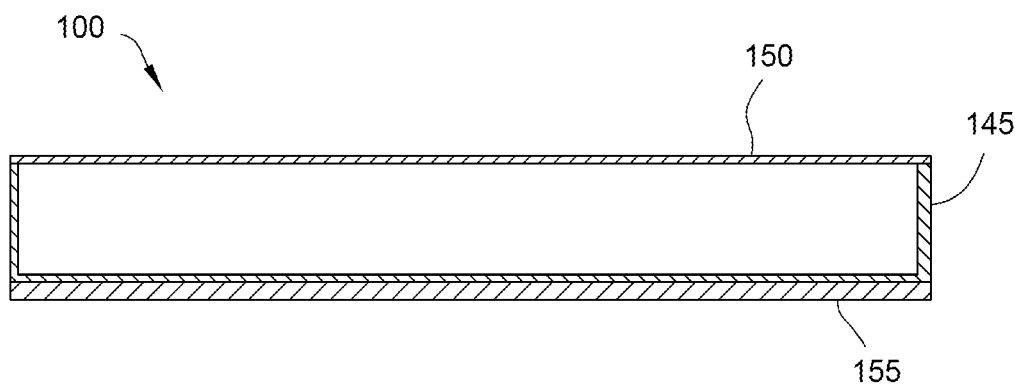

FIGS. 1A-1C illustrate a perspective exploded view, a simplified top down, and side profile view of a tape drive 100, in accordance with some embodiments. The tape drive 100 may be a tape embedded drive (TED).

In one or more embodiments, the tape drive 100 comprises an enclosure 105, wherein the enclosure 105 contains a first reel 110a, a first spindle 112a coupled to the first reel 110a, a second reel 110b, a second spindle 112b coupled to the second reel 110b, one or more motors (e.g., a stepping motor 120 (also known as a stepper motor), a voice coil motor (VCM) 125, etc.), and one or more motors (not shown) for rotating the first reel 110a and the second reel 110b, and a power storage mechanism 114 coupled to the one or more motors for rotating the reels 110. The tape drive 100 further comprises a tape 115 configured to wind around the first reel 110a and the second reel 110b, a head assembly 130 with one or more read heads and one or more write heads configured to read/write to the tape, and tape guides/rollers 135a, 135b. The first reel 110a and the second reel 110b may be collectively referred to as the reels 110. The first spindle 112a and the second spindle 112b may collectively be referred to as the spindles 112.

It is to be understood that the term "head assembly" may be referred to as "magnetic recording head", interchangeably, for exemplary purposes. It is to be further understood that the term "tape" may be referred to as "magnetic media," interchangeably, for exemplary purposes.

Each of the reels 110 may also incorporate a tape folder to help the tape media 115 be neatly wound onto the reels 110. One or more of the tape reels 110 may form a part of a removable cartridge and are not necessarily part of the tape drive 100. In such embodiments, the tape drive 100 may not be a tape embedded drive as the tape drive 100 does not have embedded media, the drive 100 may instead be a tape drive configured to accept and access magnetic media or tape media 115 from an insertable cassette or cartridge (e.g., an LTO drive), where the insertable cassette or cartridge further comprises one or more of the tape reels 110 as well. In such embodiments, the tape or media 115 is contained in a cartridge that is removable from the drive 100. As such, one or more components described herein may be disposed outside the enclosure 105. The tape media 115 may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 is biased against the guides/rollers 135a, 135b (collectively referred to as guides/rollers 135) and is movably passed along the head assembly 130 by movement of the reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

Focusing on FIGS. 1A and 1B, the reels 110 are placed in the interior cavity of enclosure 105, with the center of each of the two tape reels 110 on the same level in the cavity, and with the head assembly 130 located in the middle and below the two tape reels 110. The spindles 112 are disposed within the center of the reels 110. Tape reel motors are coupled to the spindles 112, thereby permitting the tape reels 110 to wind and unwind the tape 115.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and stepping motor 120 may variably position the tape head(s) transversely with respect to the width of the tape 115. The stepping motor 120 may provide coarse movement, while the voice coil motor 125 may provide finer actuation of the head(s). In an embodiment, servo data may be written to the tape media to aid in more accurate position of the head(s) along the tape 115.

In addition, the enclosure 105 comprises one or more particle filters 141 and/or desiccants 142, as illustrated in FIG. 1A, to help maintain the environment in the casing. For example, if the casing is not airtight, the particle filters may be placed where airflow is expected. The particle filters 141 and/or desiccants 142 may be placed in one or more of the corners or any other convenient place away from the moving internal components. For example, the moving reels may generate internal airflow as the tape media winds/unwinds, and the particle filters 141 may be placed within that airflow.

Focusing on FIG. 1C, the enclosure 105 comprises a cover 150 and a base 145. The tape drive 100 further comprises a printed circuit board assembly (PCBA) 155. The PCBA 155 is attached to the bottom, on an external surface of the enclosure 105, opposite the cover 150. As the PCBA 155 is made of solid state electronics, environmental issues are less of a concern, so the PCBA 155 does not need to be placed inside the enclosure 105. The PCBA 155 being located outside the enclosure 105 leaves room inside enclosure 105 for other components, particularly, the moving components and the tape media 115 that would benefit from a more protected environment.

It is to be understood that there are a wide variety of possible placements of the internal components of the tape drive 100 within the enclosure 105. In particular, as the head mechanism is internal to the casing in certain embodiments, the tape 115 may not be exposed to the outside of the enclosure 105, such as in conventional tape drives. Thus, the tape 115 does not need to be routed along the edge of the enclosure 105 and can be freely routed in more compact and/or otherwise more efficient ways within the enclosure 105. Similarly, the head(s) 130 and reels 110 may be placed in a variety of locations to achieve a more efficient layout, as there are no design requirements to provide external access to these components.

In some embodiments, the tape drive 100 is sealed. Sealing can mean the drive is hermetically sealed or simply enclosed without necessarily being airtight. Sealing the drive may be beneficial for tape film winding stability, tape film reliability, and tape head reliability. Desiccant 142 may be used to limit humidity inside the enclosure 105.

In one embodiment, the cover 150 is used to hermetically seal the tape drive 100. For example, the drive 100 may be hermetically sealed for environmental control by attaching (e.g., laser welding, adhesive, etc.) the cover 150 to the base 145. The drive 100 may be filled by helium, nitrogen, hydrogen, or any other typically inert gas.

In some embodiments, other components may be added to the tape drive 100. For example, a pre-amplifier for the heads may be added to the tape drive 100. The pre-amplifier may be located on the PCBA 155, in the head assembly 130, or in another location. In general, placing the pre-amplifier closer to the heads may have a greater effect on the read and write signals in terms of signal-to-noise ratio (SNR). In other embodiments, some of the components may be removed. For example, the filters 141 and/or the desiccant 142 may be left out.

Figure 2:
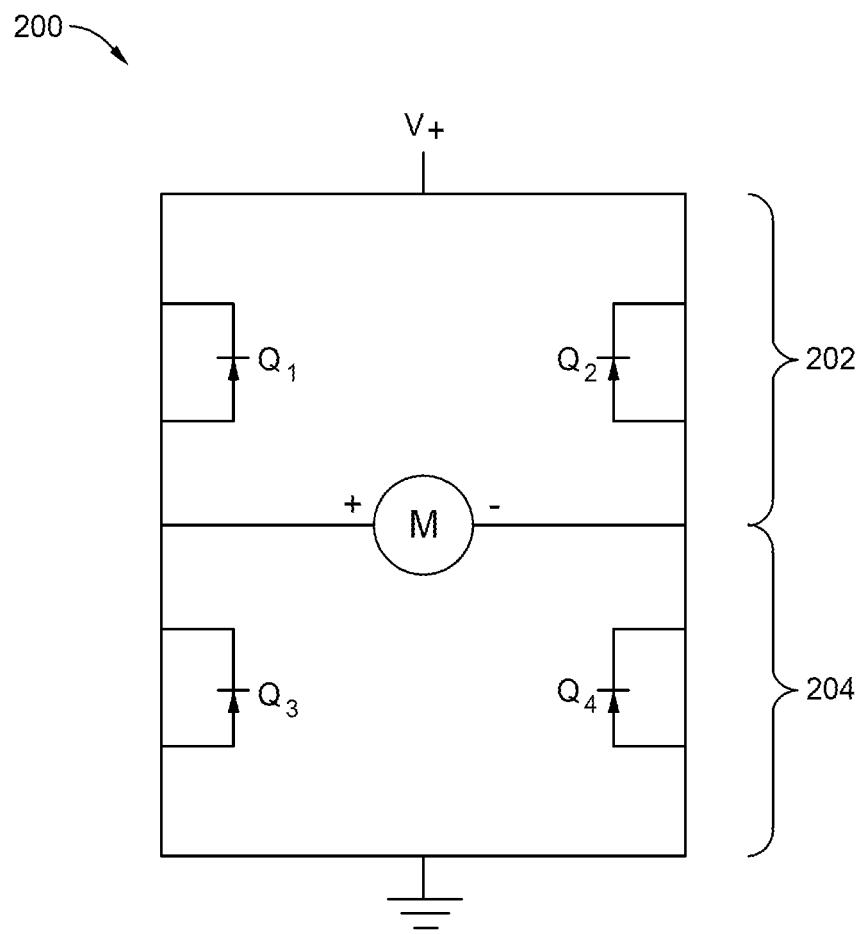
FIG. 2 illustrates schematic diagram of a regenerative braking circuit.

FIG. 2 illustrates a schematic diagram of a regenerative braking circuit 200. The regenerative braking circuit 200 may be utilized in the tape drive 100 of FIGS. 1A-1C.

The regenerative braking circuit 200 comprises a motor M coupled to a battery V+; a first loop 202, wherein the first loop 202 comprises a first metal-oxide-semiconductor field effect transistor (MOSFET) Q1 coupled to a positive terminal of the motor M, and a second MOSFET Q2 coupled to a negative terminal of the motor M; and a second loop 204, wherein the second loop 204 comprises a third MOSFET Q3 coupled to the positive terminal of the motor M, and a fourth MOSFET Q4 coupled to the negative terminal of the motor M.

When the motor M operates (i.e. power is supplied causing the motor M to turn), the fourth MOSFET Q4 and the first MOSFET Q1 are turned on, permitting a current to flow, through Q4, to the motor M causing the motor M to turn, through Q1. In other words, the motor M is drawing current from the battery.

It is to be understood that the description of FIG. 2 is in regards to a battery driven motor. In the tape drive environment, the motor will be powered in most operational circumstances not by the battery, but by an external power source which powers the tape drive overall. The motor will operate as a generator to charge the battery in a regenerative braking mode as further described below. Stated another way, a tape drive motor connected to an external power source that is not the battery will not draw current from the battery during normal operation, but rather, will only draw current from the battery when operating without receiving current from the external power source (e.g., when power supply to the drive is interrupted).

As will be further described below, in the course of winding or unwinding the tape as part of drive operation, one or both of the reel motors will need be braked. For example, a reel motor is braked to maintain tape tension or otherwise to slow down the winding or unwinding of tape. Rather than solely relying on conventional mechanical or electrical means for braking, embodiments of the invention enable the reel motors to brake regeneratively to charge a power storage device. During a regenerative braking process the motor M is connected to a power storage device or electrical load, such as a resistor. Due to the connection to the power storage device or electrical load, a force is needed to keep the motor M turning. In the case of a tape drive, the force creates the tape tension, and the power generated by the motor movement is given by the formula P=v*F where P is power, v is velocity, and F is force. In the case of a tape drive, when the motor M is not provided with external power, the reel will keep turning due to being pulled by the other reel, or more specifically the tape being wound by the other reel, that is driven by another motor powered by an external power source.

It is to be understood that the regenerative braking circuit 200 merely illustrates one possible embodiment of a regenerative braking circuit, and there are a wide variety of possible circuit configurations permitting regenerative braking. It is to be further understood that in some embodiments, other components may be added to the regenerative braking circuit 200 discussed below. For example, a DC-DC convertor and/or a current divider may be added to the regenerative braking circuit 200. The DC-DC convertor and/or the current divider convertor may be components in the regenerative braking circuit 200 or coupled to the regenerative braking circuit 200.

A benefit of regenerative braking circuits is that energy that would normally be wasted in a conventional braking system can be captured and stored for later use. As such, regenerative braking circuits are ideal for applications where a braking mechanism is frequently applied.

In regenerative braking systems in electric vehicles, when an operator of the vehicle presses on an accelerator to move the vehicle forward, an electric motor supplies a current in a forward direction to rotate a motor shaft of the electric motor, thereby rotating the wheels of the vehicle. When the operator wants to decrease the speed of the vehicle, the operator will apply a braking mechanism to slow the vehicle. However, while braking, the motor shaft continues to turn because the wheels are still rotating. This causes the current to flow in a reverse direction from the wheels to the motor, which now acts as a generator to charge a battery coupled to the motor.

As such, a similar principle can be applied to tape drives because in order to maintain a desired tape tension, a first reel motor is powered and is configured to rotate a first reel in a forward direction and a second reel motor, the motor connected to a second reel from which the tape is pulled into the first reel, is used to control a rotational speed of a second reel, to provide the proper tension. The need for such tension control is thus leveraged to provide regenerative braking, and generally the same regenerative braking mechanism can apply to any braking action to the first or second reel motor during tape drive operation. By using a regenerative braking mechanism in a tape drive, the recovered energy can be used during EPO situations where the external power source to the tape drive is removed. The stored power can be used to gracefully shutdown the tape drive without data loss. For instance, in a Tape Embedded Drive (TED), although the tape does not have to be rewound during an EPO situation, the stored power can be used to assist in maintaining tape tension during the EPO situation or to power the drive's controller for data storage or other shut down operations. In other tape drives, an EPO event may necessitate tape re-wounding, and this stored power can be used for that scenario as well.

Figure 3:
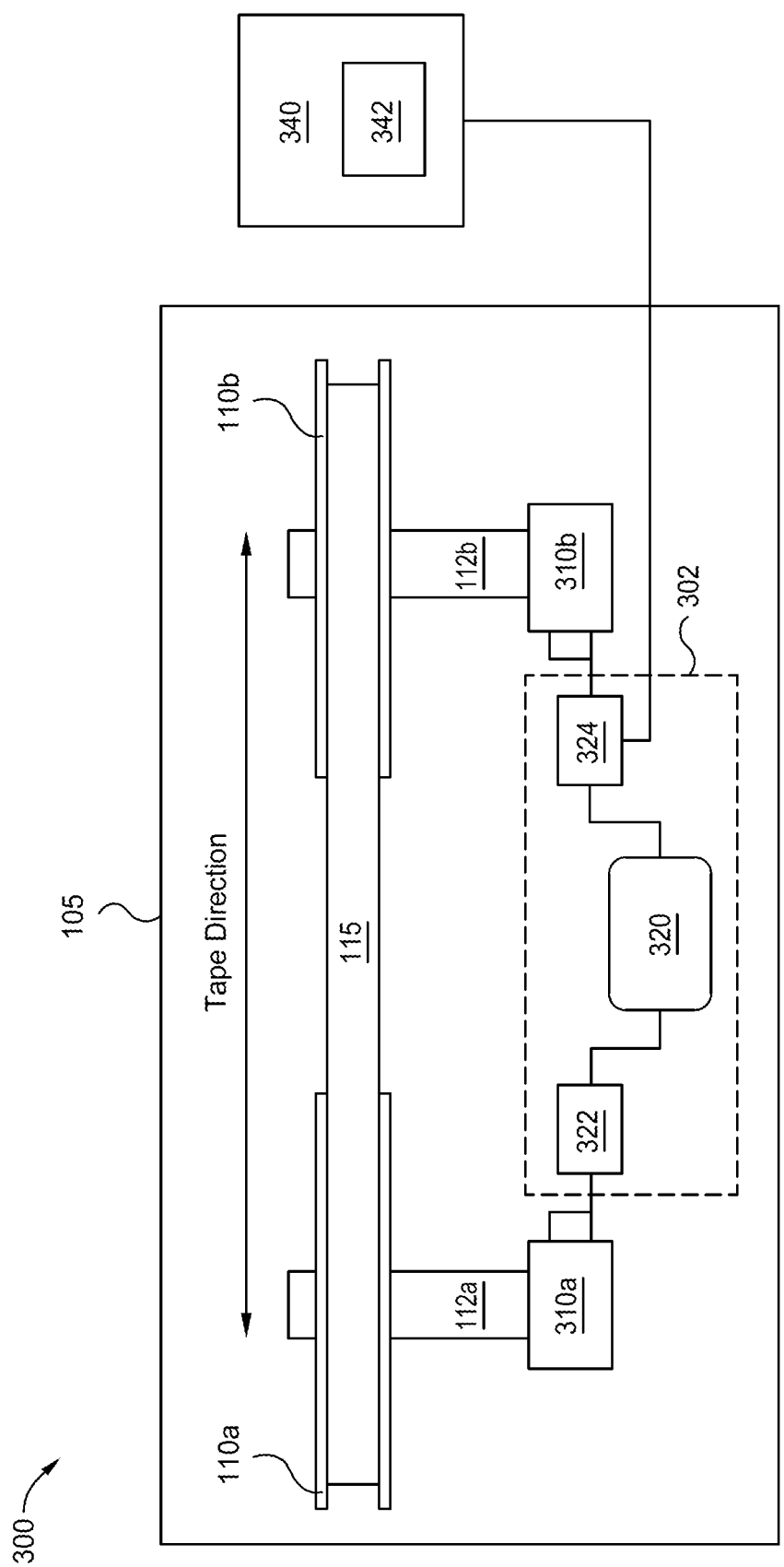
FIG. 3 illustrates a schematic view of a tape drive having a regenerative braking system.

FIG. 3 illustrates a schematic view of a tape drive 300 having a regenerative braking system. The tape drive 300 may be the tape drive 100 of FIGS. 1A-1C. The tape drive 300 comprises an enclosure 105, wherein the enclosure 105 comprises a first reel 110a; a first spindle 112a coupled to the first reel 110a; a first motor 310a coupled to the first spindle 112a, wherein the first motor 310a is configured to cause the first spindle 112a to rotate, thereby rotating the first reel 110a; a second reel 110b disposed adjacent to the first reel 110a; a second spindle 112b coupled to the second reel 110b; and a second motor 310b, wherein the second motor 310b is configured to rotate the second spindle 112b thereby rotating the second reel 110b. A tape 115 is configured to wind around the first reel 110a and the second reel 110b.

In a tape embedded drive, the tape 115 is configured to wind around both reels 110a and 110b as manufactured. In a tape drive which accepts single-reel tape cartridges (e.g. LTO cartridges), the first reel 110a can be a reel within the cartridge (which may be referred to as a supply reel), and the second reel 110b can be a reel embedded within the drive (which may be referred to as a take up reel). This is generally referring to the fact that tape is drawn from the reel in the cartridge to the reel in the drive. The tape would wind around both reels once the cartridge is inserted and loaded within the drive. However, the roles of "supply reel" and "take up reel" can be reversed when the tape is moved in a reverse direction from the reel in the drive to the reel in the cartridge. Similarly, in the tape embedded drive, either reel can be a supply or take up reel, depending on the state of the tape and the direction of its travel.

The motor 310a, when not driven by power, effectively functions as a braking mechanism that provides a resistance to the rotation of the first spindle 112a, causing the rotational speed of the first reel 110a to decrease and/or stop. In the same way, motor 310b, when not driven by power, effectively functions as a braking mechanism that provides resistance to the rotation of the second spindle 112b, causing the rotational speed of the second reel 110b to decrease and/or stop.

Stated another way, when the tape drive 300 is in operation to wind tape around the first reel 110a, external power (i.e. power supplied by the tape drive's controller and/or power control circuitry that is derived from external power supplied to the overall drive) is provided to the first motor 310a causing the first spindle 112a to rotate and wind tape 115 around the first reel 110a. The second motor 310b is not provided with external power to cause that same rotation, but still rotates due to the pull on the tape 115 by the winding of the tape 115 around the first reel 110a. The second motor 310b needs to provide resistance that permits the tape 115 to be under tension. The resistance is at least partially caused by the load on the second motor 310b during conversion to electrical energy by a regenerative braking circuit 302, and the electrical energy is stored for later use. In the opposite operation where tape is wound around the second reel 110b, external power is provided to the second motor 310b causing the second spindle 112b to rotate and wind tape 115 around the second reel 110b. The first motor 310a is not provided with external power to cause that same rotation, but still rotates due to the pull on the tape 115 by the winding of the tape 115 around the second reel 110b. The first motor 310a similarly needs to provide resistance that permits the tape 115 to be under tension. The resistance is at least partially caused by the load on the first motor 310a during conversation into electrical energy by the regenerative braking circuit 302, and the electrical energy is stored for later use. As noted above, besides maintaining tension, any braking action on the first motor 310a or the second motor 310b that is needed for drive operation can similarly be put into the same regenerative braking mode.

As such, both the first reel 110a and the second reel 110b may act as a supply reel or a take up reel. For example, in one embodiment, the first reel 110a functions as the supply reel, and the second reel 110b functions as the take up reel when the second motor 310b is configured to rotate the second reel 110b and the first motor 310a is utilized to maintain a desired tape tension by controlling the rotational speed of the first reel 110a.

As discussed above, during a braking operation (i.e., rotation of either motor 310a, 310b without applying external power), the mechanical energy is harvested and converted into electrical energy through the use of a regenerative braking circuit, this harvested energy can be captured and stored for later use. Thus, the tape drive 300 further comprises the regenerative braking circuit 302, wherein the regenerative braking circuit comprises a power storage mechanism 320, wherein the power storage mechanism 320 is coupled to the first motor 310a and the second motor 310b. In one embodiment, the regenerative braking circuit 302 may be disposed within the enclosure 105, wherein the regenerative braking circuit 302 is further disposed between the first reel 110a and the second reel 110b. In another embodiment, the regenerative braking circuit 302 may be disposed outside the enclosure 105.

When the external power source is removed, the stored power captured by the regenerative braking circuit 302 may be used to supply power to either the first motor 310a or the second motor 310b, or any other part of the drive such as the drive's controller or other circuitry (e.g. saving operational or host data in an emergency shut down situation). The power supplied by the power storage mechanism 320 (again, when the power from the external power supply is not available), is sufficient to operate either motor 310a, 310b for a period of time, but is insufficient to power the motors 310a, 310b for normal operations.

The above described regenerative braking charges the power storage mechanism 320 (i.e. the motors 310a, 310b act as a generator to charge the power storage mechanism 320). As such, the power storage mechanism 320 acts as an internal power source supplying power to the motors 310a, 310b as a back-up power source in case the external power source fails. It is to be understood that the same process described herein applies when either the first reel 110a (or the second reel 110b) functions as the take up reel and the second reel 110b (or the first reel 110a) functions as the supply reel.

In one embodiment, the regenerative braking circuit 302 further comprises a DC-DC convertor 322, wherein the DC-DC convertor 322 is coupled between the power storage mechanism 320 and the first motor 310a. The DC-DC convertor 322 converts a first DC voltage to a second different DC voltage. For illustrative purposes only one DC-DC convertor is shown. However, it is to be understood that a second DC-DC convertor may be coupled between the power storage mechanism 320 and the second motor 310b.

In one embodiment, the regenerative braking circuit 302 further comprises a current divider 324, wherein the current divider 324 is coupled between the power storage mechanism 320 and the second motor 310b, wherein the current divider 324 is further coupled to an external storage capacitor 342, and wherein the external storage capacitor 342 is disposed within an external data storage device 340.

The power storage mechanism 320 may supply power to the external storage capacitor 342 via a first path branching off the current divider 324, and supply power to the second motor 310b via a second path branching off the current divider 324. A benefit of using the power storage mechanism 320 to supply power to an external storage capacitor 342 is that in the event of an ungraceful shutdown, the external storage capacitor 342 can power the external data storage device 340, which may be configured to store data. As such, the power storage mechanism 114 may decrease or eliminate the need for an external power source to charge the external capacitor, or serve as a back-up power source in case the external power source fails.

It is to be understood that while the current divider 324 is illustrated as being coupled between the between the power storage mechanism 320 and the second motor 310b, this merely illustrates one possible embodiment. In another embodiment, the current divider 324 may be coupled between the power storage mechanism 114 and the first motor 310a. In yet another embodiment, the tape drive 300 may comprise two or more current dividers.

The power storage mechanism 320 is selected from the group consisting of: a capacitor, a super capacitor, a battery, a fuel cell, and combinations thereof, depending on the needs of the embodiment. For example, in one embodiment, the power storage mechanism 320 is a lithium battery. A benefit of using a lithium battery for the power storage mechanism 320 is that lithium batteries have a relatively high volumetric energy density as compared to super capacitors and therefore a smaller lithium battery can store the same amount of energy as a larger super capacitor. However, lithium batteries tend to lose their ability to store energy over time. A benefit of using a super capacitor for the power storage mechanism 320 is that super capacitors charge faster than lithium batteries and do not lose their ability to store energy over time. However, a larger super capacitor is required to achieve the same power storage capacity.

Table 1 illustrates an example of various properties of a lithium battery vs. a super capacitor configured to be a power storage mechanism in a tape drive having an enclosure height of 1 inch (1"), a tape width of ½ ", and a tape length of 500 meters (m), where the energy to be stored is 0.097 Wh. It is to be understood that the dimensions are simply an example as thickness, tape width, and tape length may change. Furthermore, with bigger and longer tape, device power requirements would change accordingly.

|  | Lithium Battery | Super-capacitor |
|---|---|---|
| Energy density by weight (Wh/kg) | 100 | 2500 |
| Energy density by volume (Wh/cm$^3$) | 0.5 | .001 |
| Required dimension of power storage mechanism. (cm$^3$) | 0.6 | 3.4 |

It is to be understood that the dimensions of the tape drive and the power storage mechanisms in the above example are not to be considered limiting. The tape drive and/or tape dimensions may differ depending on the embodiment. For example, a lithium battery and/or a super capacitor may be used as a power storage mechanism in a tape drive having a height of 2" and having a 1" wide tape (i.e. the lateral dimensions of the tape drive are the same as the above example). Although a wider tape has a larger tension (i.e. a 2" wide tape has approximately 2× the tension of a 1" wide tape), the tape drive will also have proportionally more volume to accommodate a larger power storage mechanism. As such, the power storage mechanisms may be larger or smaller depending on the embodiment.

Figure 4:
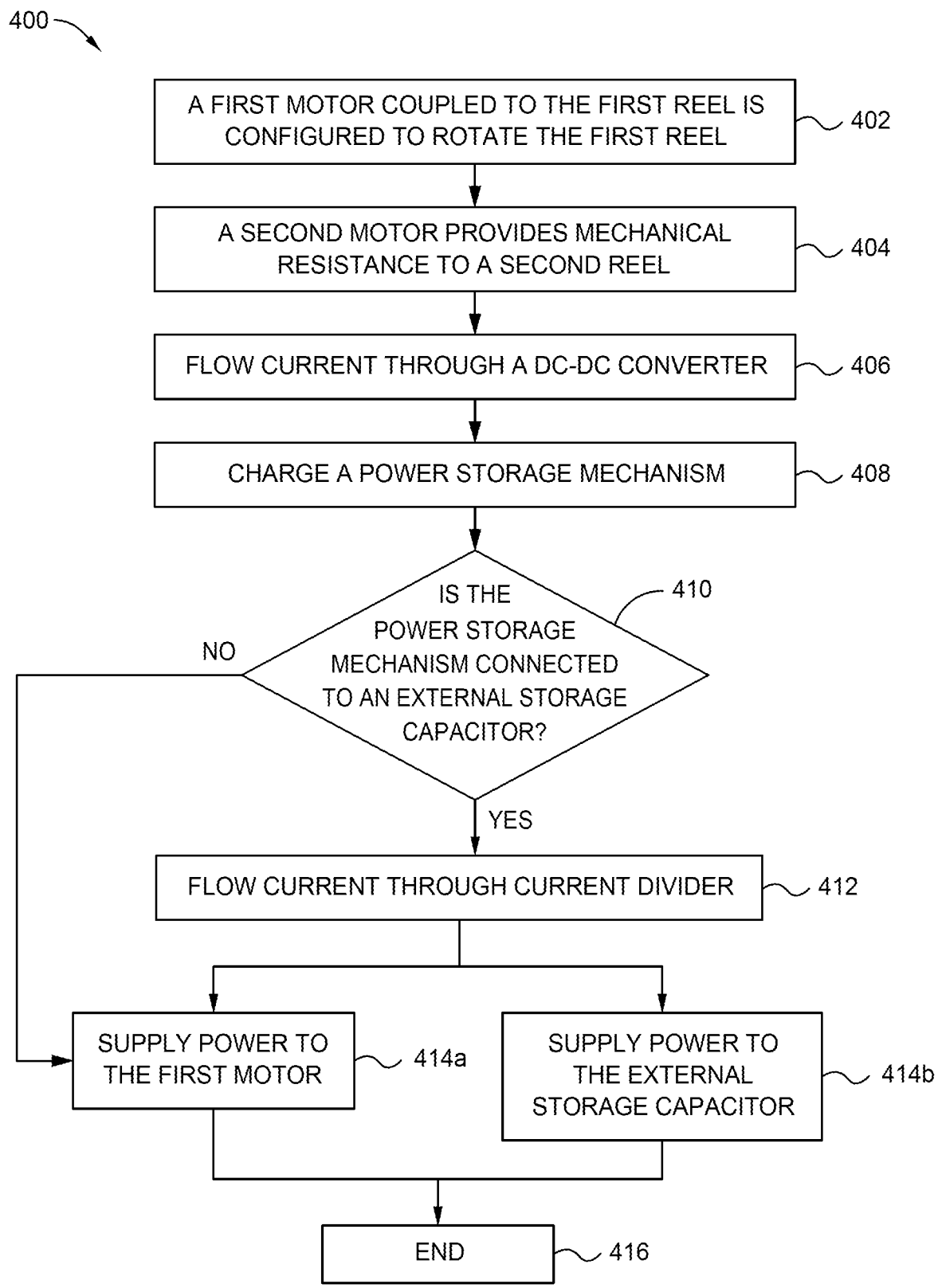
FIG. 4 is a flow diagram illustrating a method of regenerative braking in a tape drive.

FIG. 4 is a flow diagram 400 illustrating a method of regenerative braking in a tape drive. At 402 a first motor coupled to the first reel is configured to rotate a first spindle coupled to the first reel, thereby rotating the first reel. At 404 a second motor that is coupled to a second spindle provides a mechanical resistance to rotation of the second spindle which creates tension on the tape and generates mechanical energy. The mechanical energy is captured and converted to electrical energy. At 406 an electrical current is permitted to flow from the second reel motor through a DC-DC voltage convertor. At 408 the electrical current is permitted to flow to a power storage mechanism, thereby charging the power storage mechanism.

The power storage mechanism may be used in any assisted power operation or as an emergency power supply to power various operations within the tape drive. Again note that the power storage mechanism is insufficient to provide sufficient power for normal device operation. The power storage mechanism may provide sufficient emergency power, in a situation where the external power supply is removed, to permit the tape drive to complete already in progress operations. In the case of a battery as the power storage mechanism, care should be taken to ensure the battery is not drained too low so that the battery can still provide enough energy for an emergency power operation. At 410, if the power storage mechanism is coupled to an external storage capacitor, at 412 the current supplied from the power storage mechanism is permitted to flow through a current divider. At 414a the current supplied by the power storage mechanism is used to supply power to a reel motor, and at 414b the current supplied by the power storage mechanism is also and/or alternatively used to supply power to the external storage capacitor, thereby ending the regenerative braking process at 416.

However, if at 410 the power storage mechanism is not coupled to an external storage capacitor, the method proceeds to 414a where the power storage mechanism supplies power to a second motor coupled to a second reel, thereby ending the regenerative braking process at 416.

By utilizing a regenerative braking circuit within a tape drive, a reel motor can be used as a generator to recover excess energy that may be stored and used to operate a motor within the tape drive.

In one embodiment, a tape drive comprises: an enclosure; a first reel disposed in the enclosure to accept a tape configured to wind around the first reel; a first spindle coupled to the first reel; a first motor coupled to the first spindle; a power storage mechanism; a first regenerative braking circuit coupled to the first motor and the power storage mechanism wherein during a braking of the first motor, the regenerative braking circuit and the first motor convert a mechanical energy of the first motor to electrical energy for the power storage mechanism, thereby providing resistance to the rotation of the first spindle.

The tape drive further comprises a first motor is configured to provide rotational movement to the spindle and to provide mechanical resistance to the first spindle when the first motor does not cause the first spindle to rotate. The tape drive further comprises a DC-DC converter coupled between the first motor and the power storage mechanism. The power storage mechanism is a lithium ion battery. The lithium ion battery has a volume of between about 0.1 cubic centimeters (cm$^3$) to about 1 cm$^3$. The power storage mechanism is a capacitor. The capacitor has a volume of between about 35 cubic centimeters (cm$^3$) to about 40 cm$^3$. The tape drive further comprises: a second reel disposed in the enclosure; a second spindle coupled to the second reel; a second motor coupled to the second spindle; and a second regenerative braking circuit coupled to the second motor and the power storage mechanism, wherein, the tape is further configured to wind around the second reel; and wherein the second motor is configured to rotate the second spindle. The tape wherein the second motor is configured to provide resistance to the rotation of the second spindle when the first motor causes the first spindle to rotate. The power storage mechanism is coupled to the second motor. The power storage mechanism comprises a current divider. The power storage mechanism is disposed within the enclosure, and further disposed between the first reel and the second reel. The power storage mechanism is disposed outside the enclosure.

In another embodiment, a tape drive comprises: an enclosure; a first reel disposed in the enclosure configured to accept a tape configured to wind around the first reel; a second reel disposed in the enclosure and configured to accept the tape configured to wind around the second reel; a motor coupled to the second reel; and a power storage mechanism coupled to the motor and configured to be coupled to a storage capacitor, wherein the storage capacitor is external to the tape drive, wherein during a braking of the motor, a regenerative braking circuit and the motor convert a mechanical energy of the motor to electrical energy for the power storage mechanism, thereby providing resistance to the rotation of the second reel.

The power storage mechanism is configured to supply power to storage capacitor. The tape drive, further comprises a current divider coupled to the power storage mechanism; wherein: a first path of the current divider is coupled to the storage capacitor; a second path of the current divider is coupled to the motor; and the power storage mechanism is configured to supply power to the motor via the second path. The power storage mechanism is selected from the group consisting of: a capacitor, a super capacitor, a battery, a fuel cell, and combinations thereof.

In yet another embodiment, a tape drive comprises: an enclosure; a first reel disposed in the enclosure and configured to accept a tape configured to wind around the first reel; a means for controlling a rotational speed of the first reel; and a means for power storage coupled to the means for controlling the rotational speed of the first reel.

The tape drive further comprises: a second reel disposed within the enclosure, wherein the tape is configured to wind around the second reel; and a means for causing rotation of the second reel. The means for power storage is coupled to the means for causing rotation of the second reel.

While the foregoing is directed to embodiments of the present disclosure, other and further embodiments of the disclosure may be devised without departing from the basic scope thereof, and the scope thereof is determined by the claims that follow.

What is claimed is:

1. A tape drive, comprising:
an enclosure;
a first reel disposed in the enclosure, to accept a tape configured to wind around the first reel;
a first spindle coupled to the first reel;
a first motor coupled to the first spindle;
a power storage mechanism;
first regenerative braking circuit coupled to the first motor and the power storage mechanism, wherein during a braking of the first motor, the regenerative braking circuit and the first motor convert a mechanical energy of the first motor to electrical energy for the power storage mechanism, thereby providing resistance to rotation of the first spindle; and
an external storage capacitor coupled to the first regenerative braking circuit, wherein the power storage mechanism is configured to supply electrical energy to the external storage capacitor during an emergency power off situation.

2. The tape drive of claim 1, wherein the first regenerative braking circuit comprises a MOSFET.

3. The tape drive of claim 1, further comprising a DC-DC converter coupled between the first motor and the power storage mechanism.

4. The tape drive of claim 1, wherein the power storage mechanism is a lithium ion battery.

5. The tape drive of claim 4, wherein the lithium ion battery has a volume of between about 0.1 cubic centimeters ($cm^3$) to about 1 $cm^3$.

6. The tape drive of claim 1, wherein the power storage mechanism is a second capacitor.

7. The tape drive of claim 6, wherein the second capacitor has a volume of between about 35 cubic centimeters ($cm^3$) to about 40 $cm^3$.

8. The tape drive of claim 1, further comprising:
a second reel disposed in the enclosure;
a second spindle coupled to the second reel;
a second motor coupled to the second spindle; and
a second regenerative braking circuit coupled to the second motor and the power storage mechanism, wherein the tape is further configured to wind around the second reel; and wherein the second motor is configured to rotate the second spindle.

9. The tape drive of claim 8, wherein the second motor is configured to provide resistance to the rotation of the second spindle when the first motor causes the first spindle to rotate.

10. The tape drive of claim 8, wherein during a braking of the second motor, the second regenerative braking circuit and the second motor convert a mechanical energy of the second motor to electrical energy for the power storage mechanism, thereby providing resistance to the rotation of the second spindle.

11. The tape drive of claim 8, wherein the power storage mechanism comprises a current divider.

12. The tape drive of claim 11, wherein the power storage mechanism is disposed within the enclosure, and further disposed between the first reel and the second reel.

13. The tape drive of claim 1, wherein the power storage mechanism is disposed outside the enclosure.

14. A tape drive, comprising:
an enclosure;
a first reel disposed in the enclosure to accept a tape configured to wind around the first reel;
a second reel disposed in the enclosure to accept the tape configured to wind around the second reel;
a motor coupled to the second reel;
a power storage mechanism coupled to the motor and configured to be coupled to a storage capacitor, wherein the storage capacitor is external to the tape drive, wherein during a braking of the motor, a regenerative braking circuit and the motor convert a mechanical energy of the motor to electrical energy for the power storage mechanism, thereby providing resistance to rotation of the second reel; and
a current divider coupled between the power storage mechanism and the motor, wherein the current divider is configured to supply electrical energy from the power storage mechanism to:
the storage capacitor via a first path of the current divider, and
the motor via a second path of the current divider.

15. The tape drive of claim 14, wherein supplying electrical energy from the power storage mechanism to the storage capacitor thereby disables the conversion of mechanical energy of the motor to electrical energy for the power storage mechanism.

16. The tape drive of claim 14, wherein the storage capacitor is disposed within an external data storage device.

17. The tape drive of claim 14, wherein the power storage mechanism is selected from the group consisting of: a capacitor, a super capacitor, a battery, a fuel cell, and combinations thereof.

18. A tape drive, comprising:
- an enclosure;
- a first reel disposed in the enclosure configured to accept a tape configured to wind around the first reel;
- a means for controlling a rotational speed of the first reel;
- a means for power storage coupled to the means for controlling the rotational speed of the first reel;
- an external storage capacitor coupled to the means for power storage, wherein the means for power storage is configured to supply electrical energy to the external storage capacitor during an emergency power off situation; and
- a means for dividing current coupled between the means for power storage and the means for controlling the rotational speed of the first reel, wherein the means for dividing current is configured to supply electrical energy from the means for power storage to:
  - the external storage capacitor via a first path branching off the means for dividing current, and
  - the means for controlling the rotational speed of the first reel via a second path branching off the means for dividing current.

19. The tape drive of claim 18, further comprising:
- a second reel disposed within the enclosure, wherein the tape is configured to wind around the second reel; and
- a means for causing rotation of the second reel.

20. The tape drive of claim 19, wherein the means for power storage is coupled to the means for causing rotation of the second reel.

* * * * *